United States Patent
Shudark et al.

(10) Patent No.: US 9,166,648 B2
(45) Date of Patent: Oct. 20, 2015

(54) SYSTEM AND METHOD FOR TIME ADJUSTMENT IN A TIME SYNCHRONIZED CHANNEL HOPPING NETWORK

(71) Applicant: Landis+Gyr Innovations, Inc., Alpharetta, GA (US)

(72) Inventors: Jeff Shudark, Cumming, GA (US); James Hartman, Canton, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 0 days.

(21) Appl. No.: 14/289,183

(22) Filed: May 28, 2014

(65) Prior Publication Data
US 2015/0244415 A1 Aug. 27, 2015

Related U.S. Application Data
(60) Provisional application No. 61/943,193, filed on Feb. 21, 2014.

(51) Int. Cl.
*H04B 1/00* (2006.01)
*H04B 1/69* (2011.01)

(52) U.S. Cl.
CPC .......... *H04B 1/69* (2013.01); *H04B 2001/6908* (2013.01)

(58) Field of Classification Search
CPC .............. H04W 56/00; H04W 56/001; H04W 56/0015; H04W 56/002
USPC .......... 375/138, 140, 295, 316; 370/350, 503, 370/516
See application file for complete search history.

(56) References Cited

U.S. PATENT DOCUMENTS

| | | | |
|---|---|---|---|
| 8,660,108 B2 * | 2/2014 | Pratt et al. | 370/350 |
| 2007/0211785 A1 * | 9/2007 | Nakache et al. | 375/136 |
| 2008/0273518 A1 | 11/2008 | Pratt et al. | |
| 2010/0260085 A1 * | 10/2010 | Wang et al. | 370/311 |
| 2011/0211570 A1 * | 9/2011 | Heinrich | 370/350 |
| 2012/0258720 A1 * | 10/2012 | Tinnakornsrisuphap et al. | 455/442 |

OTHER PUBLICATIONS

Kang et al., "Time Slotted, Channel Hopping MAC (TSCH)", IEEE P802.15 Working Group for Wireless Personal Area Networks (WPANs), Jul. 2008, 33 pages.
PCT/US2015/013173, "International Search Report and Written Opinion", May 7, 2015, 10 pages.
Wang, et al., "Slot Time Synchronization for TDMA-Based Ad Hoc Networks", International Symposium on Computer Science and Computational Technology, IEEE, Dec. 20, 2008, pp. 544-548.

* cited by examiner

*Primary Examiner* — Khanh C Tran
(74) *Attorney, Agent, or Firm* — Kilpatrick Townsend & Stockton LLP

(57) ABSTRACT

Systems and methods are provided for adjusting time in a synchronized network by a central device on the network. Each device on the network provided current time, hopping pattern, time slot duration, and an absolute slot number. Devices on the network synchronized to communicate on a repeating schedule of time slots. The central device receives an updated time and determines a time difference between the updated time and the current time. The current time is adjusted in integer multiples of the hopping pattern length up to the time difference. The absolute slot number is updated based on the number of time slots in the adjusted time difference. The updated absolute slot number is propagated to other devices on the network. In turn, these other devices may also propagate the updated absolute slot number.

8 Claims, 4 Drawing Sheets

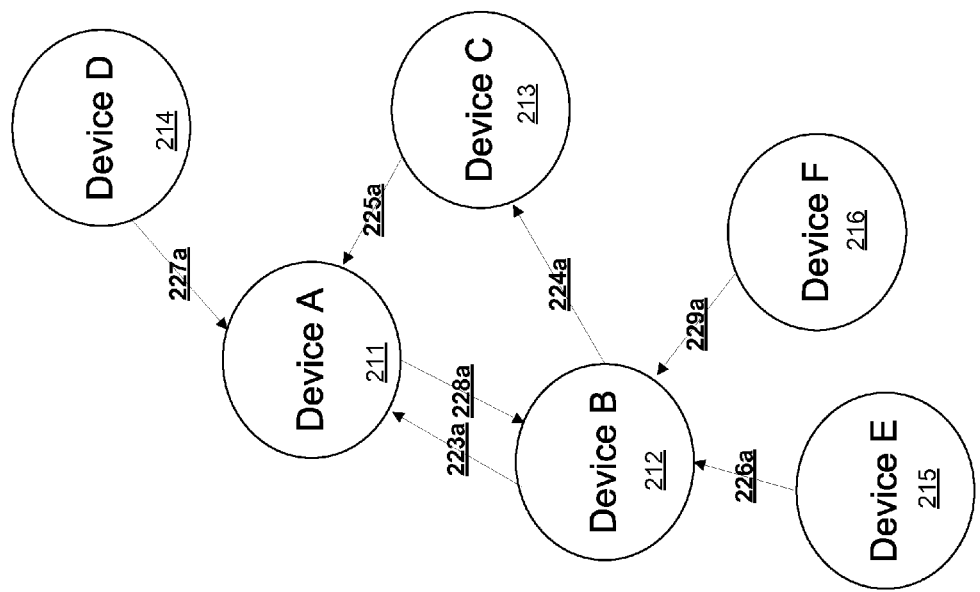

SYSTEM AND METHOD FOR TIME ADJUSTMENT IN A TIME SYNCHRONIZED CHANNEL HOPPING NETWORK

RELATED APPLICATION

This application claims priority to U.S. Ser. No. 61/943,193 filed Feb. 21, 2014 entitled Time Adjustment in a Time Synchronized Channel Hopping Network, which is incorporated herein by reference (herein '193 application).

TECHNICAL FIELD

This disclosure relates generally to adjusting time in a time synchronized network and in particular to updating an absolute slot number to adjust the time.

BACKGROUND

In a time synchronized channel hopping network, such as that defined by IEEE 802.14e, the nodes of the network need to remain synchronized. If a central node, such as a node associated with a collector seeks to adjust the time of the network, then there may be an adverse impact to the synchronicity of the network. This is especially true if the network uses Absolute Slot Numbers ("ASN"), which reflects the total number of time slots elapsed since a specific time. If a central node or collector receives an updated time from its external time source using NTP (Network Time Protocol) or other very accurate time source, and adjusts its time then it may fall out of synchronization with the other nodes on the network. In order to restore synchronization, the other nodes on the network need to make a similar adjustment.

One option is to slowly change the time at the collector, e.g. change the time 2 ms at a time. The time adjustment is then propagated through the network as messages are sent through the network. Another option is to send a broadcast message from the collector to inform the nodes of the time change and to instruct the nodes when to implement it. However, these options may require too much time to propagate the time change throughout the network or they may adversely affect the performance of the network. A time difference between the nodes may cause network instability and if the time difference is too large, it may cause the network to fail.

SUMMARY

Systems and methods are disclosed for adjusting time in a synchronized network by a device on the network, wherein the device is one of a plurality of devices on the synchronized network. The time is adjusted and information regarding the adjusted time is propagated to other devices on the network maintaining the synchronization of time slots among devices on the network.

In an exemplary method each device may be provided a current time, a hopping pattern, a time slot duration, and an absolute slot number. Devices on the network are synchronized to communicate on a shared schedule of intervals of time slots. Each time slot is of length equal to the time slot duration. The shared schedule repeats the hopping pattern. An absolute slot number shared among devices on the network synchronizes the devices on a current time slot.

A device on the network such as a central device receives an updated time and determines a time difference. Using the time difference, the central device will determine how to update the current time. The current time is updated by an adjusted time difference wherein the adjusted time difference is an integer multiple of a product of a hopping pattern length and the time slot duration that does not exceed the time difference. A remainder or time drift may remain. An Absolute Slot Number (ASN) adjustment is determined based on the adjusted time difference, wherein the Absolute Slot Number adjustment corresponds to a number of time slots in the adjusted time difference. The ASN is updated by the ASN adjustment thus maintaining synchronization of devices on a time slot. The updated Absolute Slot Number may be propagated to other devices on the network.

In response to a device such as an endpoint receiving an updated Absolute Slot Number, the endpoint device replaces its internal Absolute Slot Number with the updated Absolute Slot Number received. Additionally, these endpoint devices propagate the updated ASN to other devices on the network through network messages.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where:

FIG. 2A is a diagram illustrating nodes or devices on a wireless network;

FIG. 2B is a diagram illustrating communication links between devices in FIG. 2A on a time synchronized channel hopping network;

DETAILED DESCRIPTION

Systems and methods are provided for time adjustment in a time synchronized channel hopping (TSCH) network such as that defined by IEEE 802.14e. A TSCH network may implement a Medium Access Control (MAC) scheme which enables communication through channel hopping and high data rates through synchronization. It is based on a time slotted architecture where a schedule indicates to the device at each node on which time slot and on which channel frequency to transmit or receive data. The configuration of the devices on a network includes multiple devices that communicate via a wireless network adhering to the time slotted architecture. That is, each device is configured to transmit and receive data on a specified time slot and at a specified frequency. Some devices on the network may be central devices, also known as collectors. Other devices on the network may be endpoints. Central devices adjust their time from an external source, update their current time slot, and propagate information regarding the current time slot and time adjustment to other devices on the network. The devices on the network may be utility meters on a wireless network.

The present invention will now be described with reference to the accompanying drawings, in which exemplary embodiments of the invention are shown.

The present invention is directed to systems and methods for adjusting the time in a wireless network in a manner that maintains the devices in the network synchronized on a time slot. In a time synchronized channel hopping network, such as that defined by IEEE 802.14e, all devices in the same network are synchronized on a current time slot.

Time is divided into time slots. Multiple time slots may be grouped into a slot frame. The number of time slots in a hopping pattern defines a hopping pattern length. The number of time slots in a hopping pattern is independent of the number of time slots in a slot frame.

Figure 1:
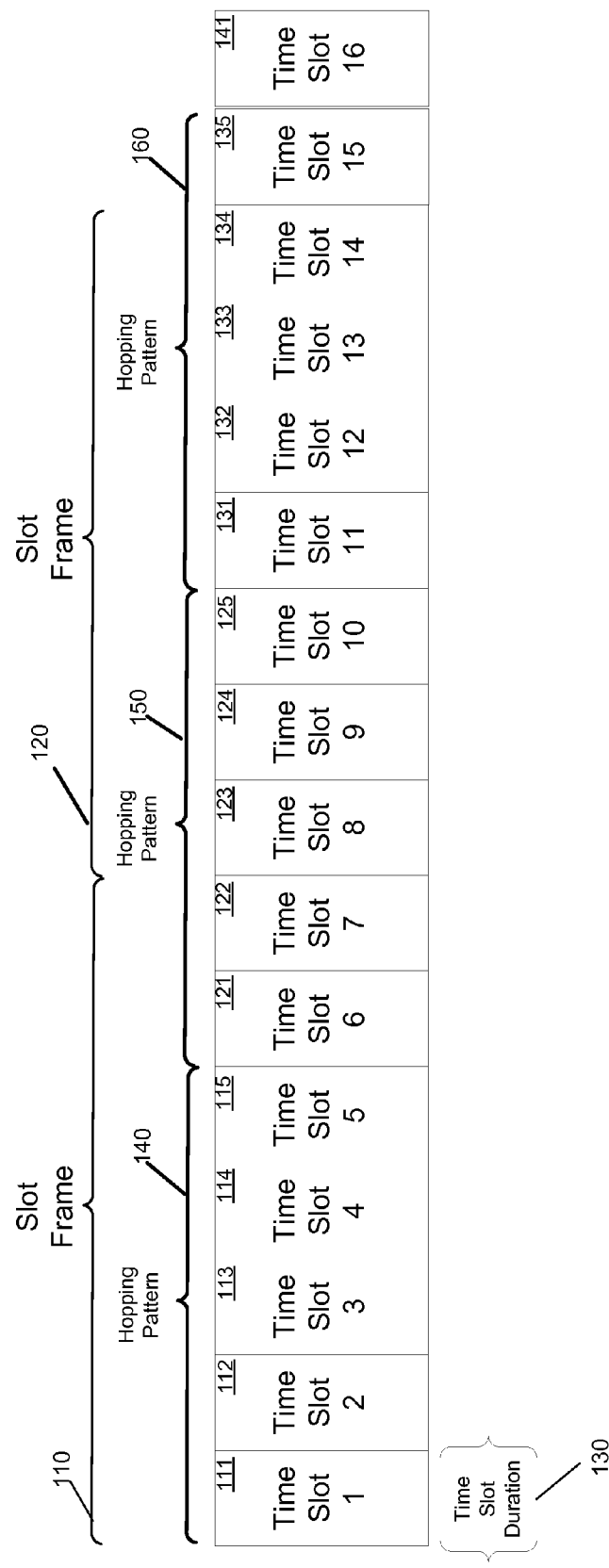
FIG. 1 is diagram illustrating the arrangement of time slots in a hopping pattern.

Each time slot is of a time duration which is the time slot duration, 'T'. FIG. 1 is a diagram illustrating time slots, a hopping pattern, and slot frames. As an example, FIG. 1 shows a hopping pattern length of five and a slot frame period of seven. Therefore, there are five time slots in a hopping pattern and seven time slots in a slot frame. Note that there can be any specified number of time slots in a hopping pattern. Likewise, there can be any specified number of time slots in a slot frame.

FIG. 1 shows that the hopping pattern repeats (140, 150, and 160). Thus, the first illustrated iteration of the hopping pattern 140 contains time slots 1-5 (111-115), the second iteration of the hopping pattern 150 contains time slots 6-10 (121-125), and the third iteration of the hopping pattern 160 contains time slots 11-15 (131-135).

Each time slot has a slot time duration of "T" 130 which can be defined in milliseconds or other appropriate time increment. During the time period "T" for each time slot, devices on the network may transmit information or receive information on different channels in a set pattern or a hopping pattern that repeats every hopping pattern length. Therefore, the pattern of activity defined for time slots within a hopping pattern length repeats.

An Absolute Slot Number (ASN) is incremented at each slot and each time slot is assigned an Absolute Slot Number (ASN). Time slot 1, 111, has an ASN equal to 1. Time slot 2, 112, has an ASN equal to 2, time slot 8, 123, has an ASN equal to 8, and so forth for each time slot. Therefore the ASN reflects the total number of time slots elapsed since a specific time.

Since the hopping pattern repeats, the pattern of activity defined for time slots within a hopping pattern length repeats. For example, if a hopping pattern has a hopping pattern length of five, time slot with ASN of 1 and time slot with ASN of 6 share the same respective position in the hopping pattern as time slot with ASN of 1 and time slot with ASN of 6 are both the first time slot in the hopping pattern. Likewise, time slot with ASN of 3 and time slot with ASN of 8 share the same respective position in the hopping pattern. Both time slot with ASN of 3 and time slot with ASN of 8 correspond to the third time slot in the hopping pattern of five.

In a time synchronized channel hopping network, devices on the network use time slots to schedule when they transmit to another device on the network or when they listen for communications from another device on the network. Additionally, time slots may be used to time the sequence of operations such as sending or receiving acknowledgments. Therefore, given the use of time slots for synchronization throughout the network, adjusting the time in a network should take into account the hopping pattern to maintain the synchronization of time slots among devices on the network. In other words, adjusting the time should maintain the same hopping sequence alignment among devices in the network.

FIG. 2A illustrates devices A (211), B (212), C (213), D (214), E (215), and F (216) on an exemplary time synchronized channel hopping network that is wireless. Communication between devices is illustrated as arrows between the devices and adheres to the time slotted architecture. FIG. 2B is a table illustrating an example of a schedule of communication between devices during the first hopping pattern. This example implements a hopping pattern of seven. Time slots 1-7 are arranged along the X axis and channels 1-5 are arranged along the Y axis. The hopping pattern of seven is shown below in Table 1. Communication during time slot 1 is through channel 2. Communication during time slot 2 is through channel 1. Communication during time slot 3 is through channel 3. Communication during time slot 4 is through channel 5. Communication during time slot 5 is through channel 2. Communication during time slot 6 is through channel 4. Communication during time slot 7 is through channel 7. This pattern repeats as shown in Table 1 for time slots 8-14 and again for time slots 15-21.

TABLE 1

| Time Slot ASN | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| Ch | 2 | 1 | 3 | 5 | 2 | 4 | 7 | 2 | 1 | 3 | 5 | 2 | 4 | 7 | 2 | 1 | 3 | 5 | 2 | 4 | 7 |

Each time slot is of duration time "T". In this example, the hopping pattern length is seven time slots. For purposes of explanation, the phrase "during time slot 1" refers to "during the time 'T' for time slot 1." Similar phrases will be used to denote the time elapsed for each time slot.

Referring back to FIG. 2B, during time slot 1, device B 212 sends a transmission to device A 211 on channel 2 shown by box 223 and arrow 223a. That is, during the time 'T' for time slot 1, Device B 212 transmits information to device A 211 and device A 211 listens for the transmission from device B 212 on channel 2. During time slot 2, device E 215 transmits to device B 212 on channel 1 as shown by box 226 and arrow 226a. During time slot 3, device A 211 transmits to devices B, as shown by box 228 and arrow 228a. During time slot 4, device B 212 transmits to device C 213 on channel 5 as shown by box 224 and arrow 224a. During time slot 5, device F 216 transmits to device B 212 on channel 2 as shown by box 229 and arrow 229a. During time slot 6, device C 213 transmits to device A 211 on channel 4 as shown by box 225 and arrow 225a. During time slot 7, device D 214 transmits to device A 211 on channel 2 as shown by box 227 and arrow 227a. Once the time "T" for time slot 7 elapses, the hopping pattern repeats. Note however, the pattern of communication between devices as shown in FIG. 2B may or may not repeat. This example of devices communicating adhering to time synchronized channel hopping is for illustration purposes and not intended to limit the scope of this disclosure.

Referring to FIG. 2A, devices A-F (211-216) are devices on a network that may be configured as a central device or an endpoint. A central device may also be a collector as it collects information from other devices on the network. In FIG. 2A, device A 211 is configured as a central device and a collector as it collects information from device B 212, device C 213 and device D 214. Devices B (212), C (213), D (214), E (2145), and F (216) may be endpoints such as utility meters.

Figure 3B:
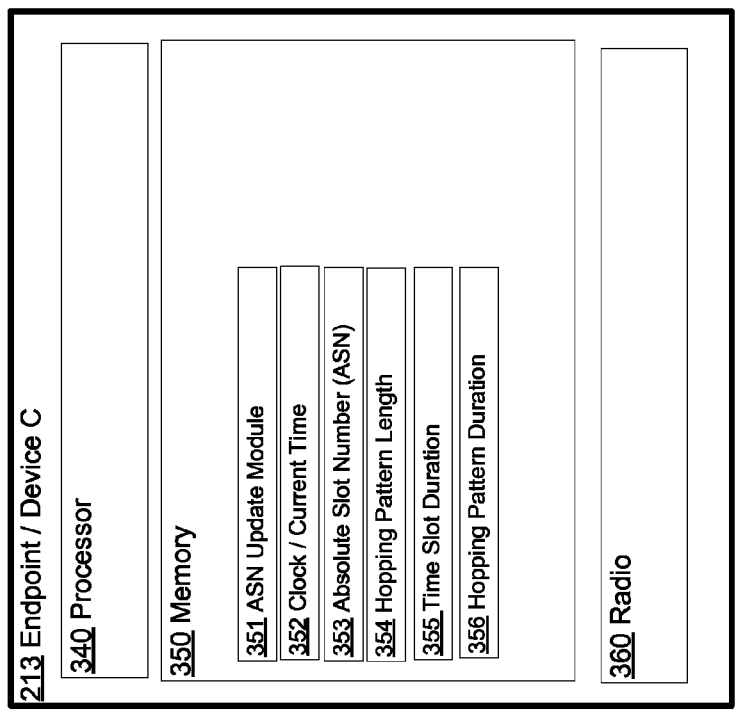
FIG. 3B is a diagram illustrating an endpoint device that updates its ASN.
Figure 3A:
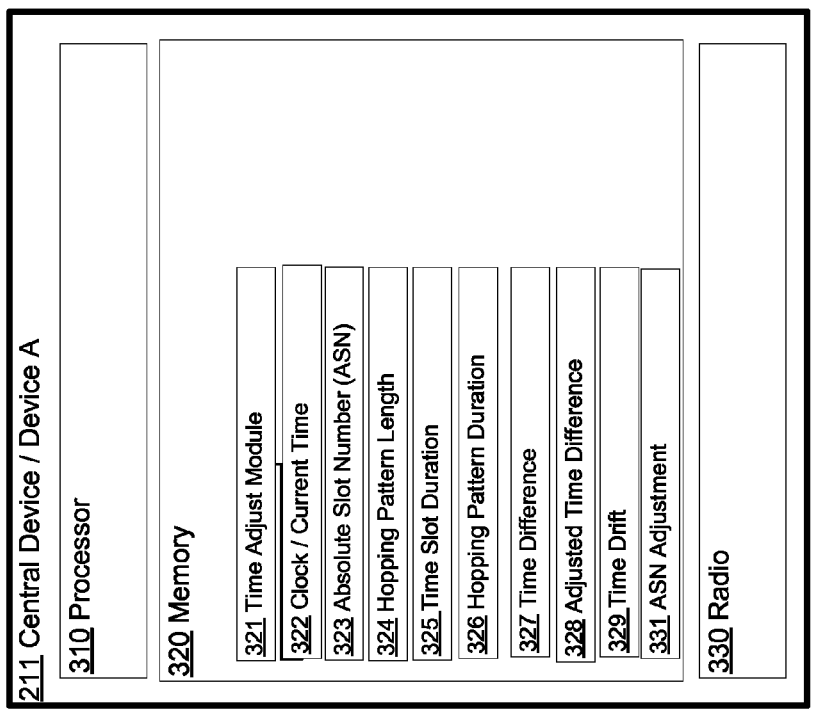
FIG. 3A is a diagram illustrating a central device that adjusts the time in a network.

Each central device on a network may make a time adjustment. In one exemplary system, central devices on a network make the time adjustment and propagate information regarding the time adjustment to other devices on the network. FIG. 3A illustrates an exemplary configuration of a central device. In this example, central device A 211 is shown. Central device A 211 comprises a processor 310, memory 320, and a radio 330. Memory 320 comprises a time adjust module 321, a clock/current time 322, an Absolute Slot Number (ASN) 323, a hopping pattern length 324, a time slot duration 325, a hopping pattern duration 326, a time difference 327, an adjusted time difference 328, a time drift 329, and an adjusted ASN. The clock 322 keeps the current time for central device 211. The ASN 323 is the current absolute slot number for that device. The hopping pattern length 324 is the number of time slots in a hopping pattern. The time slot duration 325 is the length of time for one time slot. The hopping pattern duration 326 is the length of time for a hopping pattern. The time difference is the difference between the current time kept by the clock 322 and an updated time which may be received via radio 330. The adjusted time difference 327 is the amount of time that the current time kept by clock 322 will be adjusted. The time drift 329 is any remaining amount of time left from the time difference that is not taken into account in the adjusted time difference 327. The ASN adjustment 331 is the amount used to update the ASN 323. In some embodiments, the values illustrated by FIG. 3A may be an interim result of a calculation executed by the time adjust module.

When an updated time is received, the instructions in the time adjust module are executed by processor 310 to update the ASN 323 and adjust the current time kept by clock 322. Additionally, the updated ASN is sent to other devices on the network.

Other devices on the network that are not central devices may be endpoints. These devices synchronize their ASN when they receive information from a central device. FIG. 3B illustrates an exemplary configuration of endpoint 213. These devices, such as devices B-F (212-216) in FIG. 2A, may comprise a processor 340, memory 350, and a radio 360. The memory 350 for endpoint 213 comprises an ASN update module 351, a clock 352 with a current time, an Absolute Slot Number (ASN) 353, a hopping pattern length 354, a time slot duration 355, and a hopping pattern duration 356. The clock 352 keeps the current time for endpoint device 213. The ASN 353 is the current time slot number for this device. The hopping pattern length 354 is the number of time slots in a hopping pattern. The time slot duration 355 is the length of time of each time slot. The hopping pattern duration 356 is the length of time for a hopping pattern. Note that the hopping pattern length 354 kept by endpoint device 213 should be the same as the hopping pattern length 324 kept by central device 211. Likewise, the time slot duration 355 should be the same as the time slot duration 325. Also, since the time slot durations and hopping pattern lengths should be the same between the devices, the hopping pattern duration 326 of central device 211 and the hopping pattern duration 356 of endpoint 213 should also be the same. In some embodiments, the values illustrated by FIG. 3B may be an interim result of a calculation executed by the ASN update module.

When a message from a central device is received with an update to the ASN, the instructions kept in the ASN update module 351 are executed by the processor 340 to update the ASN 353. This updated ASN is propagated by endpoint devices to other devices on the network via network messages.

All devices, whether a central device 211 or an endpoint 213, on the network keep an internal clock with a current time and an ASN. When a central device receives an updated time, it makes a time adjustment to its internal clock. The updated time may be received from an external source using NTP (Network Time Protocol). The time adjustment to the current time kept by clock 322 is made by determining the time difference between the current time and the updated time received. This time difference is used to determine an absolute slot number (ASN) that will be propagated to other devices on the network. The time difference is also used to update the current time in clock 322. The internal clock in some devices keeps the Medium Access Control (MAC) time. The MAC time may be used by the devices to determine the sending of beacon messages. Note that since time in a time synchronized channel hopping network is divided into time slots, any adjustment to the time in the internal clock may impact the synchronization of time slots among devices.

In one exemplary system, a central device 211 keeps the current time using its internal clock 322. When the central device 211 receives an updated time from its time source, its processor 310 executes the time adjust module 321 to adjust the current time in clock 322 and update the ASN 323. The time adjust module has instructions to compare the updated time received to the current time kept by clock 322 to determine a time difference 327. If there is a time difference 327, the central device determines how to adjust the current time kept by its clock 322. To keep devices on the network synchronized, the current time is adjusted in increments of the hopping pattern duration 326 up to the time difference 327. Since the current time may only be updated in increments of the hopping pattern duration 326, not all of the time difference 327 may be accounted in the adjustment of the current time. The amount of time that the current time in clock 322 is adjusted by is the adjusted time difference 328. The adjusted time difference 328 will be less than or equal to the time difference 327. Additionally, the time adjust module 321 comprises instructions to update the ASN 323 using the adjusted time difference 328 and propagates at least the updated ASN to other devices on the network via radio 330.

To determine how to adjust the current time kept by clock 322, the time adjust module 321 contains instructions to determine the hopping pattern duration 326 from the hopping pattern length 324 and the time slot duration 325. The hopping pattern duration 326 may be calculated by multiplying the hopping pattern length 324, 'X' by the time slot duration 325, 'T'. For example, if the hopping pattern length 324 is 5, 'X'=5, and the time slot duration is 325, 'T' is 26 ms., the time duration for the hopping pattern or hopping pattern duration 326 is (26 ms.*5) or 130 ms. To keep the devices on the network synchronized on a time slot, the time difference is used to adjust the current time on the internal clock 322 only in multiples of the hopping pattern duration 326. The adjusted time difference is therefore equal to multiples of the hopping pattern duration 326. The current time kept by clock 322 is adjusted by the adjusted time difference 328. If the time difference 327 is an integer 'n' multiple of the product such that n(X*T) is equal to the time difference 327, the time difference 327 and the adjusted time difference 328 are equal. The central device 211 adjusts its current time in clock 322 by the adjusted time difference 328 which is equal to the time difference 327. However, if the time difference 327 is not an integer 'n' multiple of the product n(X*T), the central device determines an integer multiple of the product that is just smaller than the time difference 327 (the adjusted time difference 328) and adjusts its current time by that amount. The integer multiple 'n' may be the integer quotient of the time difference 327 divided by the hopping pattern duration. That is, n is the integer multiple of the product (X*T) that is just smaller than the time difference 327. Note a remainder 'R' or time drift 329 of the time difference remains.

For example, as shown in FIG. 1, given the hopping pattern length of 5, X=5, and the time duration of a time slot to be 26 ms, T=26 ms, the hopping pattern duration is (X*T) or 130 ms. The central device adjusts the internal clock by the adjusted time difference of 1430 ms because the time difference 1430 ms is an integer multiple (i.e., n=11) of the hopping pattern duration which in this example is 130 ms. That is 1430 ms=11(5*26 ms). The adjusted time difference is equal to the time difference in this example since the time difference can be accommodated in eleven periods of duration equal to the hopping pattern duration. In other words, the duration of eleven hopping patterns equal the adjusted time difference.

However, if the time difference is 500 ms, which is not an integer multiple of the hopping pattern duration of 130 ms, the time is adjusted by an adjusted time difference which in this example is not equal to the time difference. The adjusted time difference is a multiple of (X*T) that is just smaller than the time difference. In this example, the integer portion of quotient 'q' of 500 ms/130 ms is 3. The time would be adjusted by the adjusted time difference of 390 ms which is 3(5*26 ms) or the time duration of three hopping patterns. The remainder of 110 ms. remains which would be the time drift. In one exemplary system, the remainder or time drift is disregarded when adjusting the current time Since the ASN reflects the total number of time slots elapsed since a specific time, it is also updated or adjusted when the current time is adjusted. The adjusted time difference is used to update the ASN. Since the adjusted time difference reflects multiples of the hopping pattern length, the ASN is updated so that the updated ASN corresponds to the same offset in the hopping pattern as the current ASN.

The central device 211 determines an ASN adjustment 331. The ASN adjustment 331 is the value used to adjust the ASN. To determine the ASN adjustment, the central device uses the adjusted time difference 328 which is a multiple of the hopping pattern length 324 as described above. The ASN adjustment 331 may be determined by dividing the adjusted time difference 328 by the time slot duration 325. Alternatively, the ASN adjustment may be determined by multiplying 'n' by the hopping pattern length, where 'n' is the delta in the ASN/hopping pattern length. Using the above examples, if the adjusted time difference is 390, the ASN adjustment 331 would be 15 which is the adjusted time difference 328 (390 ms) divided by the time slot duration 325 (26 ms). Hence the ASN adjustment is 390 ms/26 ms. Note that 15, is also n (3) multiplied by the hopping pattern length of 5. Hence the ASN is adjusted by 15. For example, if the ASN 323 is 3, it will be updated to its current value plus the ASN adjustment. So the ASN will be updated to 18 which corresponds to (3+15). Note that since the hopping pattern length is 5, an ASN of 3 corresponds to the respective time slot that is the third time slot from the beginning of the hopping pattern. An updated ASN of 18 also corresponds to the same offset since it is the third time slot in a subsequent hopping pattern. Hence, the updated ASN maintains the hopping sequence alignment shared by all devices on the network as it is the third time slot in the hopping pattern.

The updated ASN may be communicated to other devices on the network by the central node. The communication of this information may be via an Enhanced Beacon message. One advantage of using an Enhanced Beacon to communicate the updated ASN is that an additional message is not required.

Referring to FIG. 3B, once other devices on the network such as endpoint device 213 receive an updated ASN the instructions in the ASN update module 351 executed by processor 340 would update its ASN 353 to the value received. Therefore, an endpoint device would adopt the received ASN as the ASN 353.

Figure 4:
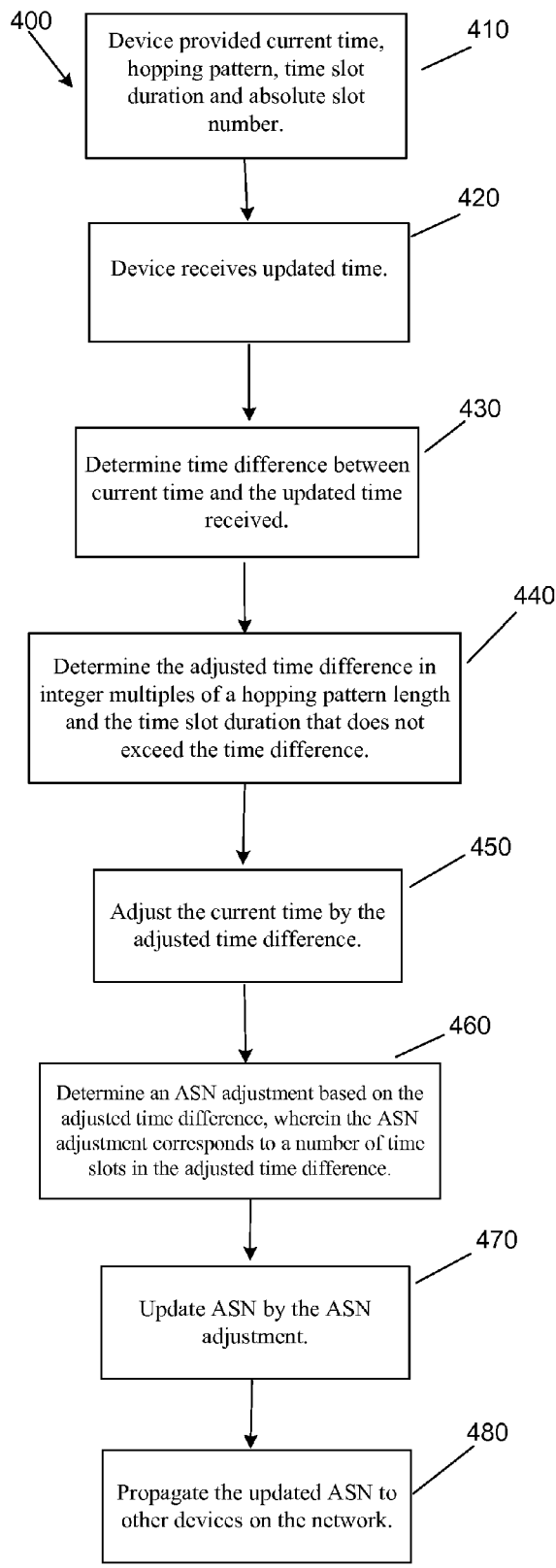
FIG. 4 is a flowchart illustrating a device adjusting its time in a network and updating its Absolute Slot Number.

FIG. 4 illustrates a process 400 for adjusting the time on a time synchronized channel hopping network by a central device or collector. At step 410, the central device is provided a current time, a hopping pattern, a time slot duration, and an Absolute Slot Number (ASN). Other devices on the network are provided the same hopping pattern, time slot duration, and ASN.

The central device at step 420 receives an updated time from an accurate time source.

At step 430, the central device determines a time difference. The time difference is the difference between the updated time received and the current time.

At step 440, the device determines an adjusted time difference. The adjusted time difference is an integer multiple of a product of a hopping pattern length and the time slot duration that does not exceed the time difference. If the time difference is an integer multiple of the hopping pattern duration, the adjusted time difference is equal to the time difference. If the time difference is not an integer multiple of the hopping pattern duration, the adjusted time difference is determined as an integer multiple of the hopping pattern duration that is just smaller than the time difference. The remaining time difference is the uncompensated time drift.

At step 450, the current time is adjusted by the adjusted time difference. Hence the current time is updated in multiples of the hopping pattern duration.

At step 460 an ASN adjustment is determined based on the adjusted time difference. The adjusted ASN is used to update the ASN.

At step 470 the ASN is updated by the ASN adjustment. At step 480, the updated ASN is propagated to other devices on the network.

General Considerations

These examples given are only for illustrative purposes and not meant to limit the invention to these devices. While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art. In particular, the steps performed to adjust the current time or update the ASN do not necessarily have to be performed in the order specified. For example, the current time may be updated before or after the updated ASN is determined.

The invention claimed is:

1. A method for adjusting time in a synchronized network by a node on the network, wherein the node is provided a current time, a hopping pattern, a time slot duration, and an absolute slot number, comprising:

receiving an updated time;

determining a time difference by comparing the updated time to the current time;

determining an adjusted time difference, wherein the adjusted time difference is an integer multiple of a product of a hopping pattern length and the time slot duration that does not exceed the time difference;

adjusting the current time by the adjusted time difference;

determining an absolute slot number adjustment based on the adjusted time difference, wherein the absolute slot number adjustment corresponds to a number of time slots in the adjusted time difference; and updating the absolute slot number by the absolute slot number adjustment.

2. The method of claim 1 wherein the synchronized network is a time synchronized channel hopping network (TSCH).

3. The method of claim 1, further comprising:

transmitting the updated absolute slot number to another device on the network.

4. The method of claim 3, wherein the updated absolute slot number is transmitted via a message on the network.

5. The method of claim 4, wherein the message is a beacon message.

6. A central device comprising:

A processor unit that includes a processor and non-transitory processor unit memory, wherein the non-transitory processor unit memory includes computer-executable instructions for adjusting the time in a synchronized network and information comprising a current time, a hopping pattern, a time slot duration, and an absolute slot number; and wherein the processor is operable to execute computer-executable instructions from the non-transitory processor unit memory to:

receive an updated time;

determine a time difference by comparing the updated time to the current time;

determine an adjusted time difference, wherein the adjusted time difference is an integer multiple of a product of a hopping pattern length and the time slot duration that does not exceed the time difference;

adjust the current time by the adjusted time difference;

determine an absolute slot number adjustment based on the adjusted time difference, wherein the absolute slot number adjustment corresponds to a number of time slots in the adjusted time difference; and update the absolute slot number by the absolute slot number adjustment.

7. The central device of claim 6, wherein the processor is further operable to execute computer-executable instructions from the non-transitory processor unit memory to:

transmit the updated absolute slot number to other devices on the network.

8. A method for adjusting time in a synchronized network by a central device, the central device one of a plurality of devices on the synchronized network, comprising:

providing to the plurality of devices on the network a current time, a hopping pattern, a time slot duration, and an absolute slot number;

receiving by the central device an updated time;

determining by the central device a time difference by comparing the updated time to the current time;

determining by the central device an adjusted time difference, wherein the adjusted time difference is an integer multiple of a product of a hopping pattern length and the time slot duration that does not exceed the time difference;

adjusting by the central device the current time by the adjusted time difference;

determining by the central device an absolute slot number adjustment based on the adjusted time difference, wherein the absolute slot number adjustment corresponds to a number of time slots in the adjusted time;

updating by the central device the absolute slot number by the absolute slot number adjustment;

transmitting by the central device the updated absolute slot number to one or more of the other devices on the network;

receiving the updated absolute slot number by one or more of the other devices on the network;

updating by the one or more other devices on the network their respective absolute slot number by the received updated absolute slot number; and transmitting by the one or more other devices on the network the updated absolute slot number to one or more of the other devices on the network.

* * * * *